INVENTOR.
Harvey L. Slatin
BY Norman Hollard

April 13, 1965     H. L. SLATIN     3,178,716
APPARATUS FOR PROGRAMMING AND AUTOMATION
Filed April 3, 1962     3 Sheets-Sheet 2
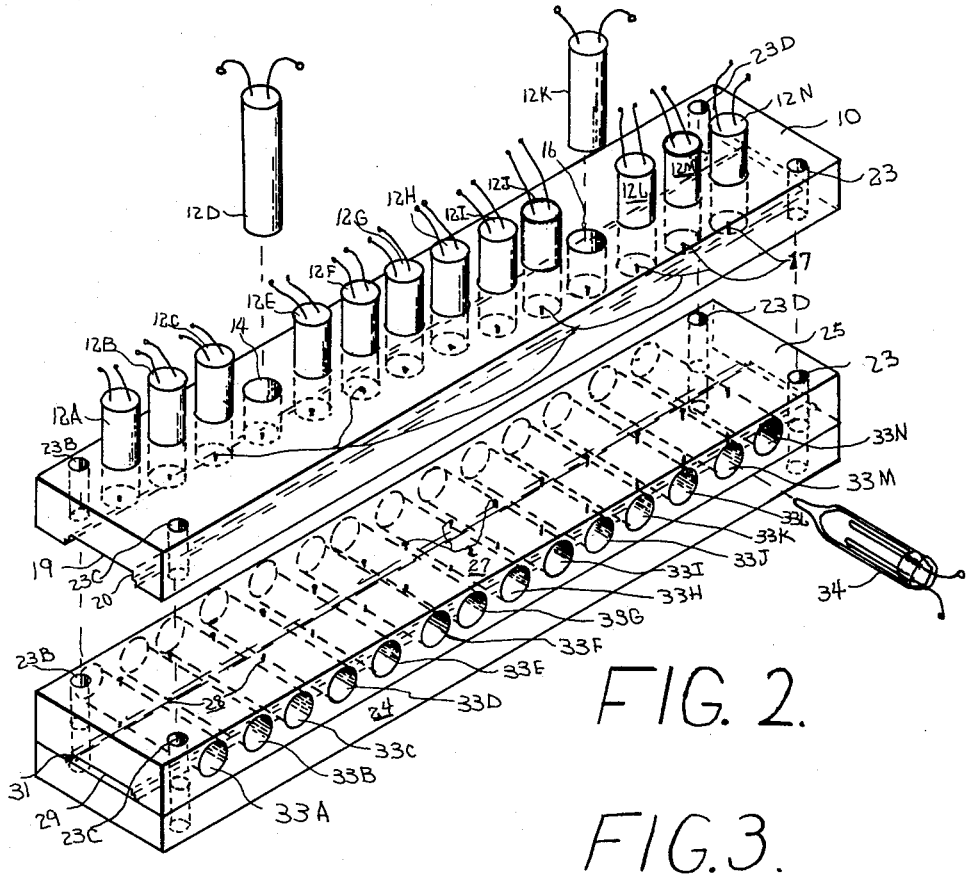
FIG. 2.
FIG. 3.
FIG. 1A.
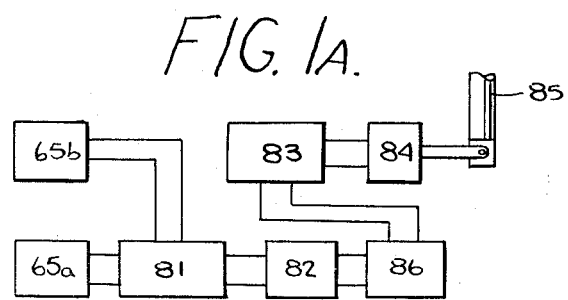
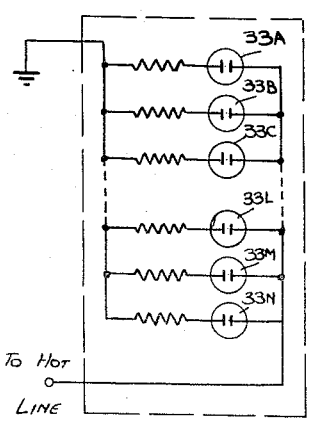
FIG. 5.
INVENTOR.
Harvey L. Slatin
BY INVENTOR.
Harvey L. Slatin

United States Patent Office 3,178,716
Patented Apr. 13, 1965

3,178,716
APPARATUS FOR PROGRAMMING AND AUTOMATION
Harvey L. Slatin, New York, N.Y., assignor to Timax Associates, New York, N.Y., a partnership
Filed Apr. 3, 1962, Ser. No. 184,816
8 Claims. (Cl. 346—33)

The present invention relates to an automation and program control system and to apparatus useful in such a system for the control and operation of driveable elements such as machine tools, machines, manufacturing devices and the like, and is particularly directed to a novel method for programming and automating using the same apparatus for both the programming and the automating.

In the usual automation in modern industry, systems based on some form of numerical control are used. Although these systems have great merit and wide acceptance, numerical control systems are expensive to construct due to their requiring one set of equipment for providing the information input and additional equipment to define direction, distance, slope angle, curvature, the rate of change of these, feed rate, tool selection, and so forth. In addition, such systems are inflexible and cannot be applied to a large variety of operations or machines. Most of such automating devices employ a punched tape or shaped film or punched card and function in a static stepwise fashion so that their accuracy is limited to .001 inch in any lineal dimension and the slope angle to .01°, for example. Also some operations cannot be so translated in automation. Further, special auxiliary programming equipment is needed to automate machine control. A means for translating such information as direction, measurement, operation, etc. must be recorded by a mechanical means in a code that can subsequently be utilized by the automator to perform the desired mechanical or electrical operations. Since the programming is sequential in action, only one action can take place at a time. In contour machining or cutting, a digital programming is complex and a difficult problem. Finally, only the most expensive systems can function in three dimensions simultaneously.

Accordingly, the object of this invention is to provide an automation and programming system which is less expensive due to its simplicity and which utilizes the equipment to be automated for automating and programming.

A further object of this invention is to provide a combination automator-programmer system which is useful in a wide variety of different fields for monitoring and/or controlling and/or operating machines, manufacturing devices, processes and the like. A few examples of applicable areas are (1) machine tools such as lathes, milling machines, jig borers, drills, and the like; (2) textile or weaving machinery, particularly those having to manufacture intricate pattern designs as in tapestries; (3) robot operated subways or trains; (4) the activation and control of mobile sculpture for esthetic or advertising purposes; (5) contour cutting automatically; (6) chemical process industry systems; (7) packaging and assembly systems; and other examples similar to those listed above.

It is an additional object of this invention to provide a combined automator-programmer that is simple to operate by those skilled in the field of application and which is at the same time accurate in replication and capable of performing a number of operations and/or controls simultaneously.

Another object of this invention is to provide a combined automation-programmer that can perform the manipulations of more than one man at a time.

It is a further object of this invention to provide a system and apparatus for automating a factory.

It is still a further object of this invention to provide a simple and efficient system for programming and automating any machine or device or process which can now be operated or controlled or activated by pushing a button, turning a wheel, twisting a knob, pulling a lever, closing a switch, manipulating a handle, stepping on a pedal, shuttling, pushing or any combination of like manipulations.

Other and further objects of the invention will be obvious upon an understanding of the illustrative embodiment about to be described, or will be indicated in the appended claims, and various advantages not referred to herein will occur to one skilled in the art upon employment of the invention in practice.

The aforementioned objects together with further objects and novel features are achieved by providing a system and apparatus wherein the performance of an operation of a machine or device or process or the like, the self-same act which puts the machine or device in motion or the process in action causes simultaneously a record to be made on a moving strip of photographic film, for example, in such a manner that each encoding record represents precisely the operation or control. These ends are accomplished in one and the preferred manner of the invention by causing the machine or device or process to be activated thru suitable electronic switching in such a way that the machine or device or process is under the direct control of the operator or operators during the registering of the program while the machine or device or process is actually doing its desired planned function. After the series and sequences comprising the accumulated total of operations of the machine or device or process have been completed, the film is processed after removal from the programming section of the apparatus. Thereafter, when it is run thru the automator section of the apparatus, all the operations of the program will be precisely and exactly replicated. The programmed record is made so that only the desired planned operations are subsequently reperformed.

A prefered embodiment of the invention has been chosen for purposes of illustration and description and is shown in the accompanying drawings, forming a part of the specification, wherein:

FIG. 1a is a diagrammatic illustration of a drive for programmed motion sculpture;

FIG. 2 is a partially exploded perspective view of an apparatus for programming, automating, and activating in accordance with one aspect of the invention;

FIG. 3 is a plan view of a section of exposed photographic film record produced by the programming section of the apparatus and used in the automator section in one aspect of this invention;

FIG. 5 is a schematic diagram illustrating the neon lamps connected for automation.

Figure 1:
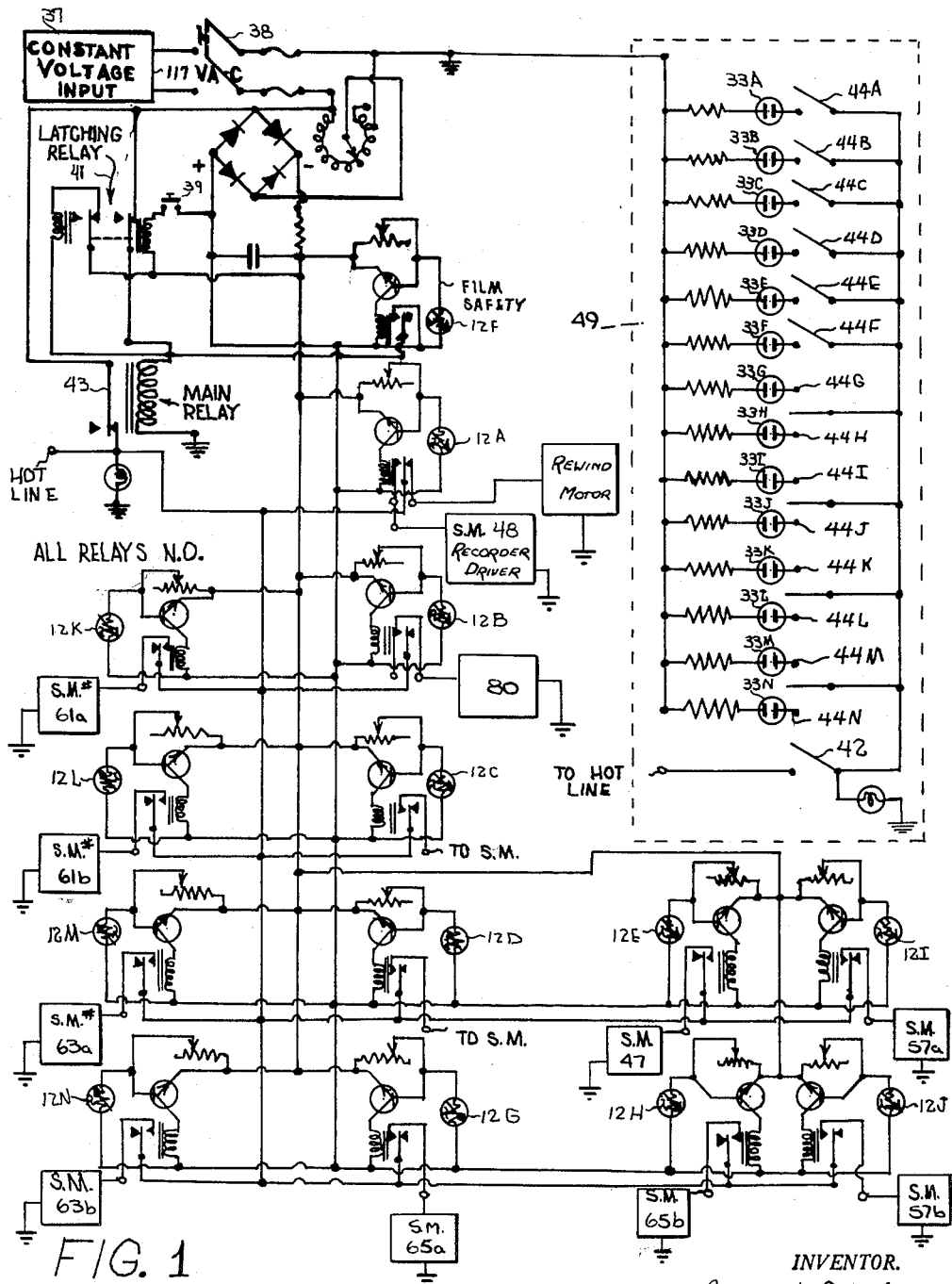
FIG. 1 is a schematic circuit diagram illustrating one system of the preesnt invention used in the activation of the servo mechanisms and in recording that activation.

Referring to FIGS. 1 and 2 illustrating the system and an apparatus used in recording and performing the automation of machinery, a photoelectric cell holder generally designated 10 having a plurality of photoelectric cells 12A through N in place therein. Cells 12D and 12K are shown removed temporarily from their respective sockets 14 and 16. In the center and at the bottom of each socket of the retaining photocell chamber there is a hole 17 which communicates between the photosensitive section of the photocell and the film slot passageway or channel 19. These holes 17, in this example, are displaced from each other transversely by .040 inch and longitudinally by .300 inch. The holes themselves are .030 inch in diameter. The various photocells rest on the bottom of the sockets containing them so that the respective holes communicate directly with a coincident part of the active area of the resident photocell. The film, not shown, is guided thru the cell holder 10 by lands 20.

Cell holder 10 is located by pins in pin holes 23 through which a means (not shown) for securing the cell holder to the recorder retaining plate 24 and the illuminator-holder 25 is made. The holes 17 in the cell holder correspond precisely with the holes in the upper and lower parts in the illuminator-holder 25 since they are carefully drilled therethrough in a straight line while assembled. The upper holes 27 and the lower holes 28 are .032 inch in diameter. These dimensions and these displacements are by no means critical and may be varied by .004 inch, for example, without changing the operating characteristics of the apparatus. The lower apertures communicate with an identical film passageway or channel 29 as that in the cell holder channel 19, and the unexposed film is similarly guided therethrough by the lands 31, the counterpart of 22. The drive mechanism which guides and causes the unexposed film to travel through channel 29 is the same drive mechanism which will subsequently drive and guide the exposed film through the channel 19 when automating. Corresponding to the center of the laterally displaced holes 28 and 27 are illuminator receptacles 33A through N which correlate to the photocells 12A through N inclusively. A typical illuminator used in the practice of this invention is a neon bulb 34 shown temporarily retracted from its receptacle 33M, for example. It can be readily appreciated that light from each illumination source can only pass to its correlating photocell, namely, during programming, for instance, photocell 12G can only see the light emitted by bulb 33G. Cell 12A communicates solely with 33A, or 12K only with 33K, and so on. Also, during automation, photocell 12B will be activated by light emanating from bulb 33B only if the film passing thru channel 19 and communicating with hole 17B is transparent.

Referring specifically to FIG. 1, the neon bulbs 33A through N and the photocells 12A through N correspond with those shown in FIG. 2. One source of power for the circuitry may be a constant voltage input 37 well-known in the art, which is used to feed power through the main DPDT switch 38 to various subcircuits, rectifying, magnetic and the like. The electrical circuit is energized when switch 38 is closed and push button switch 39 has been momentarily depressed thereby locking the latching relay 41 in the ON position and pulling the main circuit relay 43 ON. SPST switch 42 is then closed and when SPST switch 44E, for example, in the programmer section is closed, the neon bulb 33E is illuminated. The light shining on photocell 12E through apertures 27E and 17E reduces the resistance through the photocell causing its associated transistor to conduct, thereby closing normally open relay associated with the photocell 12E circuit, which in turn supplies electrical power to servo-mechanism (S.M.) 47. At the same time during programming, film traveling through channel 29 will be exposed by light from bulb 33E passing through aperture 28E. When the bulb is extinguished by opening SPST switch 44E, the electrical power to the servo-mechanism 47 is likewise cut off and it comes to an instant stop, if so required. Also there is no further exposure to light of the film passing beneath aperture 28E. When bulb 33A is illuminated by throwing SPST switch 44A, the servo-mechanism 48 is activated. In this case, the servo-mechanism 48 is a constant speed and reversible motor which is used to drive and guide the unexposed film tape in such a fashion thru passage channel 29 during programming that it is held in close proximity to apertures 28, and during automation, it drives and guides the exposed film through passageway 19 in close proximity to apertures 17. The unexposed film is fed from a supply reel, passes through its respective passageway or channel and is held wound on a take-up reel. None of this is illustrated since film threading, winding, movement through gates, take-up, and the like are well-known. The illumination from bulb 33A shines thru apertures 27A and 17A, falling on photocell 12A, activating S.M. 48 as stated hereinabove. At the same time, during programming, the light passing through aperture 28A strikes the unexposed film which is being drawn through passageway 29 of illuminator-holder 25 thereby exposing that portion of the film. This light striking the photographic emulsion will be recorded thereon as a spot, dot, dash or line depending on how long the SPST switch 44A is ON. An exposed section of film 21 is shown in FIG. 3. For clarity, the opaque sections of the film are shown in white and the transparent sections are shown in black. The line width will be about .032 inch.

In a like fashion, turning other switches 44B through 44N (with the exception of 44F, whose special functions are explained below) will cause the associated servo-mechanisms to be activated and at the same moment cause exposure of the photographic film, making a permanent record thereof. Photocells 12G through 12N are associated in programming with SPDT switches 44G through 44N. These control reversible constant speed motors or other stepping motors or relays or control motor speed regulators such as variable transformers, potentiometers, variable rheostats, Selsyns, and the like. Hence, these switches have ON-OFF-ON positions, so that SPDT switches 44K-44L, for example can be off as shown in FIG. 1 or ON at 33K and OFF at 33L, or ON at 33L and OFF at 33K, or OFF at both 33K and 33L. This feature will be clearly understood by consideration of the examples given below.

Photocell 12F is a safety film control and serves to stop the operation. If the film strip should crack or break during its use in automation, light will strike the photocell 12F causing the latching relay 41 to break the electrical energy supply which inactivates the main relay contactor 43, shutting off the electrical power in all circuits and ringing an alarm if desired. This subcircuit may be used for other purposes as will be explained below.

The system of manipulating switches 44 is used only during the programming phase. Subseqently, after the completion of all the desired operations of the machine or process, these mutliple switches are disconnected and removed from the circuit and equipment. The exposed film is processed so that the print is black and opaque except for those streaks, lines, dashes or dots where light from the several bulbs impinged on the film emulsion. FIG. 3 represents a section of film made in connection with the automation of motion sculpture.

The film may be 16 mm. or 35 mm. or any convenient size. The width of the film determines the number of separate channels available for the diverse operations to be performed. For example, 16 mm. single sprocketted film can automate 14 different operations at one time. The number of different operations is limited in part by the ability to position physically the photocells across the width of the photographic film and by the diameter of the smallest aperture necessary to conduct in the circuit. Whereas acetate film may be used, because of a possible wear problem and for other reasons, Cronar base film manufactured by the Du Pont Company is preferred.

This invention may also be practiced using magnetic tape or film in place of photographic film.

In automation of the machine, device or process, the processed film is fed thru the film passageway or channel 19 in the same direction the film passed through the programming section. However, in automation, the following circuit changes must be made. The neon bulbs 33 are all illuminateed as long as the film is moving through the channel 19 or in other words, when S.M. 48 is in the ON condition, or forward direction. Thereatfer as the film passes through the photocell holder, the respective relays and the interconnected servo-mechanisms are activated or cut-off depending on whether or not light from the illuminating bulbs is permitted to pass through the apertures to the respective photocells by the markings on the film.

Figure 4:
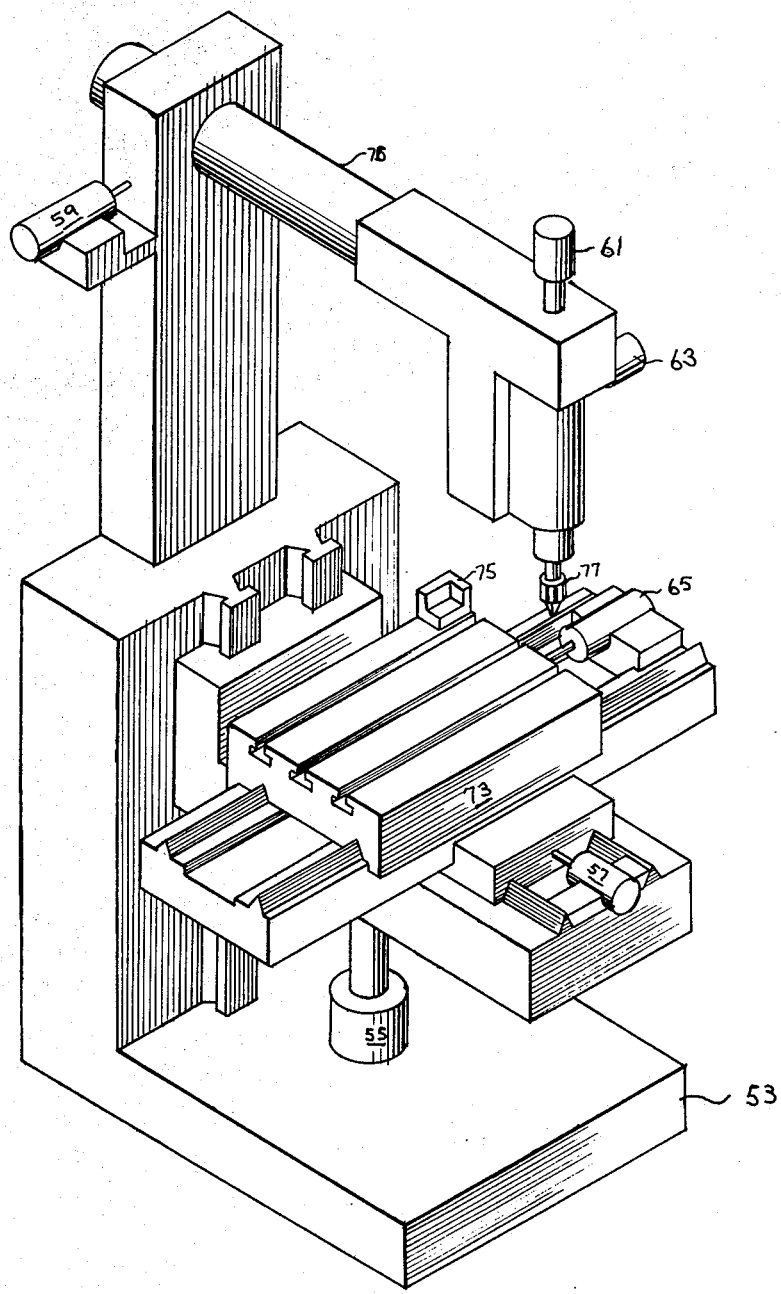
FIG. 4 is a perspective view of a machine tool illustrating the versatility of application of the aforesaid invention.

I will now describe an application of this invention in the field of machine tooling as represented by the machine illustrated in FIG. 4. This machine is mechanically supported on a base 53, and the machine in normal usage is operated by hand with the usual carriage return switches. However, in the practice of this invention, the machine is operated in its normal manner during programming through the interposition of the programming circuit as shown in FIG. 1. In this manner the machine operates under the direct control of the operator who controls the machine through the motors 57, 61, 63 and 65.

Motor 65 controls the movement of the bed 73 to the right or left through a siutable drive coupling. Motor 65 is reversible and S.M. 65a is operated through switch contact 44G to rotate motor 65 in a direction to move the bed 73 to the right. Closing switch contact 44H opens contacts 44G and couples S.M. 65b to the motor 65 to energize and to turn it in the opposite direction to move the bed 73 to the left. Opening either switch 44G or 44H stops motor 65 maintaining bed 73 in a fixed position.

Reversible motor 57 moves the bed 73 forwards and backwards. Closing switch contact 44I operates motor control S.M. 57a to drive the bed forward and closing switch contact 44J operates motor control 57b to reverse the motor and drive the bed 73 backwards.

Motor 61 controls the speed of the rotation of the milling head motor through a variable transformer or similar speed regulator. Closing switch contact 44K activates motor control S.M. 61a to turn the motor 61 in a direction to increase speed and closing switch contact 44L activates motor control S.M. 61b to decrease motor speed. Opening switch 44K or 44L maintains the speed of rotation of the drive motor 61 constant.

Motor 63 regulates the depth of feed. Closing switch contact 44M activates motor control S.M. 63a to energize motor 63 to lower the chuck 77 and closing contact 44N activates S.M. 63b to energize the motor 63 to rotate in the opposite direction and to raise chuck 77.

By adding additional controls the speed of these movements in any direction can be varied as described above for motor 61 so as to control the rate of feed of the cutting tool.

As is normal in these machines, the machine is fitted with dial micrometers and other measuring devises as part of their normal construction (but not shown).

A reversible motor 59 rotates the milling head support arm 75 in either direction and reversible motor 55 raises and lowers the entire bed. These may be controlled by similar circuits if desired in the same manner as described above.

The indexing point fixture 75 is used to center the work and to provide a constant reference point. The work to be machined is clamped in place using the fixture 75 as a positioning point. Then, the machine is set by hand until the reference point 75 is precisely defined by the intersection of three mutually perpendicular planes in the X—Y, X—Z, and Y—Z axis, which result in one point (triple point of intersection). There are many devices on the market for determining this point. In this illustration, 35 mm. photographic film is used since more than 14 channels are required for operation as shown in FIG. 1.

The work is now clamped to bed 73 leaving the reference point undisturbed. The unexposed film is threaded through the holder and passageway 29 using a suitable length of black leader and the film cartridge section is closed to light. The switch system for programming is installed as explained above, and thereafter, until the completion of the programming of the entire operation, all operations are manipulated by means of the switches 44A–44N.

SPST switch 44A is thrown to start the unexposed film going through the illuminator-holder 25. Then after a few moments SPST switch 44F is closed. This action shuts the equipment OFF and is used for automatically stopping the operation when in automation, since in throwing this switch a pip of light is simultaneously recorded on the film.

SPST switch 44F is now returned to its normally open position and is not used again until after the completion of operations of the program. The equipment is started up again by depressing switch 39, and S.M. 48 which is the film drive motor continues to drive and guide the unexposed film through its channel.

Let us assume that the blueprint of the part to be machined calls for a series of holes to be drilled in a plate as the first of a number of operations. This may have been roughly laid out on the work to hasten the operations. Closing contact 44I activates S.M. 57, in this example, thereby traversing the bed 73 forwards and closing contact 44G sets motor 65 moving the bed 73 longitudinally to the right. Both of these contacts are manipulated (or 44I and 44H) by turning them ON or OFF until the drill held in chuck 77 is precisely over the point where the first aforementioned hole is to be drilled. At any time, the machinist can stop the film and turn off whatever illuminators are on by opening main switch 38, or in some cases by opening 44A in order to make adjustments, take readings, consult blueprints, or for any other reason, none of which action uses up film or takes time in the automation. Closing 44K speeds up the spindle speed of the milling head and closing SPDT switch 44L slows the spindle speed of motor drive 61.

The depth of feed is controlled by S.M. 63a and closing contact 44M lowers the chuck 77 and closing contact 44N raises it. The machinist in observing and directly controlling the drilling operation can select such feed rates and spindle speeds as are compatible with good machining practice. When the hole has been drilled to the proper depth, as determined by the operator through instruments or by other means, such as stops, the boring drill is withdrawn by reversing motor 63 by closing contact 44N which reverses the direction of travel of the boring tool. It is obvious that limit switches (not shown) but common to automated equipment may be used to prevent jamming of the bed or other movable parts against end stops.

In a similar manner, the machine operator can program the drilling or boring of other holes as demanded by the work through actually doing the desired operation using switches 44A–44N. When the series of operations involved with this particular tool size is completed, the next tool required may be moved into position manually or automatically by use of a turret head in conjunction with S.M. 59, or if a multiple head is not available, the tool and work are returned to the reference or index point as explained above. When returned to the reference point, SPST switch 44F is thrown, which shuts down the operation, if this is the end of the sequence of operations to be performed. If it is not the end, closing 44E, for example, sets off an alarm, which summons the machinist, during the automation, to change a tool or for other reasons. It must be apparent that the characteristics of each tool must be the same to obtain the same results.

Let us further assume the next step required involves a contour milling operation. The milling cutter is installed in the chuck, and SPST 44E switch is opened, shutting OFF the alarm and permitting the programming of the positioning of the milling cutter in the chuck and preparing for the first cut in the work piece. The contacts used are 44G through 44N and others of an appropriate nature. Through experience or by other means the spindle speed is programmed and set as well as the depth of cut as explained above. Then by manipulating the proper SPDT switches for motors 65 and 57 as explained above, any intricate pattern may be followed and milled out. Also at any time that is desired, the machinist may be assisted by additional hands who may aid in the control of the machine operations described or to control other S.M. maneuvers and operations thereby permitting automatic checking, guaging, undercutting, contour cutting, engraving, and the like. It is apparent that more than one major operation may be performed at one time if multiple heads are available or in special tandem operations. Inspection of a completed operation or of an operation in progress may be incorporated into the record, and by ADD circuits, can be made to shut down the operation and sound an alarm, where, for example, due to tool wear, a guage detects an incorrect hole or slot.

Any required milling or machining that must be done is automatically performed together with any necessary checking for accuracy or stopping for examination or correction. When the entire sequence of the various operations has been performed that are possible on the machine, the index is returned to its zero position or reference point at 75. The SPST switch 42 is opened which cuts out all lamps in the holder. Sufficient film is run on to the take-up reel to empty the film holder and to circumvent exposure in removing the exposed film from its receptacle. The film is processed in the known manner.

For automation, the programming switching assembly is disconnected and removed from the apparatus, and the following connections are made usually by the expediency of changing from one plug board to another to give the circuit illustrated in FIG. 5.

When the relay activated by 12A is ON not only is S.M. 48 operating in its forward direction, but all the neon lamps 33A–N are illuminated. Lamp 33F is always ON as long as main relay 43 is ON. Secondly, in automation, when the relay system serviced by photocell 12A is in the OFF position, a rewind motor goes into operation by means of a magnetic clutch which rapidly rewinds the film back on to the feed forward reel, until the pip opposite to lamp 33F comes into appearance, then as seen above, the entire equipment shuts down awaiting the machinists setting-up another workpiece and tool and starting the operation again by depressing switch 39 which turns on 33A and starts the film through the slot 19 in the cell holder. The processed film, as explained, will show light transparent spots, dashes, lines, or streaks and the like wherever light from the neon bulbs 33A–N is permitted to strike the film when the bulbs and the corresponding S.M. were activated. The remaining areas on the film tape are opaque to light. A black or opaque leader is attached to both the front end and the back end of the processed film. The film is threaded through film channel 19 and fitted onto the take-up reel. DPDT switch 38 is closed if not yet closed and button switch 39 is depressed until the film on the automator passes the automatic cut-off pip made in the course of programming. The unmachined part is installed in the position index 75 and zeroed in by hand until the reference point or index is established (assuming the machine had been used for another purpose in the interim). The proper first tool is installed and button 39 is depressed, and thereafter, the light coming through exposed portions of the film precisely and exactly activates the motors, servomotors, gauges, etc. in the same manner and in the same way as was done previously during the programming. Each and every act done by the machinist or operator will be replicated automatically by the machine. When the end of the tape is reached, the film is reversed as explained and now the rewound film automatically shuts off at the index point and awaits the start-up by the machinist. Further additional OR circuits or ADD or NOR circuits or the like may be installed to supplement the activity of the invention. For example, the edge of the film may be used to de-energize the main relay 43 in case of film injury. An important advantage of programming by simultaneously performing the operation and setting up the program lies in the ability of the machinist to add his fine touch to an otherwise mechanical adjustment. This feature is reflected in the feel of the finished product which looks as if it were individually made, and in the preservation and longevity of the machinery and equipment.

Another example of an application of the instant invention is the programming of a mechanized motion sculpture useful for esthetic viewing or in advertising. In this connection, due to the complexity and strange motions that must be performed, cams, profiles, and the usual programming devices are not suitable. In addition to the intricacy demanded, a good part of the art stems from the precise artistic feel or touch of the creator of the motion. As will be seen from the description below, this problem does not readily lend itself to solution by presently known programming and automation techniques. Referring once again to FIGS. 1 and 2, the S.M. will now relate to motors or servo-mechanisms associated with the activation and movement of motion sculpture.

The sculpture usually, but not always, consists of a single rod or blade of metal (or a plurality of these) which are firmly attached at one of their ends and which are caused to oscillate or vibrate in such a manner and at such constantly varying and spasmatic frequencies and rates that they present changing illusions of a solid elastica, or a pulsating cone, or involute shapes that defy description, but which are pleasing and fascinating to behold. By changing driving speeds, a single rod can be made to simulate harmonic curves of a variety of amplitudes and positions retaining fixed nodes or having traveling nodes depending on the artist controlling the sculpture. In addition, a play of lights reflecting from the surface of the gyrating swinging rod can have an attractive and captivating appearance. Such lights playing up and down the bewitching rod, varying in color as well as intensity, can have a mesmerizing effect. If the erratic twisting motion in the rod is synchronized to the sound of specially composed music or aural effects, the gesticulating rod seems anthropomorphized.

In order to achieve these effects, one must be highly skilled in the practice of manipulating the various controls as well as having a flair for the artistic. Also, since the number of variable controls are beyond the manipulation of one man, a number of assistants are required in order to achieve the full effects.

The apparatus is set-up for programming as explained hereinabove. Unexposed film is threaded in the manner described above for programming except that an indicating device is attached to the film drive sprockets so that the exact position of the film tape is known. The film is drawn through channel 29 after switch 39 has been depressed. The counter is set at zero reading. Closing switch 42 and then 44A sets the film drive S.M. 48 in operation. Closing switch 44B actuates the relay associated with photocell 12B which in this instance turns on the audio device 80 for recording the audio portion on magnetic tape or the recording may be pretaped in which case the audio device 80 is turned on and the motion of the sculpture brought into synchronization with the sound. Closing contact 44G activates the motor control 65a associated with photocell 12G whose function it is to alter the output of a variable transformer 82. As illustrated in FIG. 1a, the output of this variable transformer 82 is fed to a variable speed motor 83 which causes a reciprocating device 84 to vibrate from side to side or backward and forward, depending on the relative position of the viewer. Mechanically secured to the reciprocation device is one end of rod 85 whose length may be 40 inches to 60 feet in length, depending on the scale of motion sculpture desired. Opening contact 44G stops the motor 81 but the rotational position of the variable transformer 82 remains unchanged. Closing contact 44H actuates motor control 65b and reverses the rotational direction of motor 81 to reduce the transformer 82 output and thereby reduce the speed of the variable speed motor 83 for the reciprocator 84, i.e. this reduces the rate of vibration of the secured metal rod 85. Limit switches on the high and low side of the variable transformer prevent accidental injury to the transformer through inadvertent overrun or jamming. Thus, it is seen that by opening or closing SPDT 44G or 44H the rod can be caused to describe a harmonic curve or elastica having one or more nodes and presenting the illusion of a solid surface. The frequency of oscillation alters the amplitude and the rate of vibration and swaying of the rod and the variation thereof can be adjusted to synchronize with the sound of music of the tape recorder or other sound source. Further, switch 44C has its relay associated with photocell 12C coupled to a relay 86 in the input to variable speed motor 83 to stop the motor 83 when switch 44C is closed at any time to cut power, and such action lets the rod feedback energy of momentum to the reciprocating device to produce certain desired effects.

Other possible manipulations are for instance by closing switch 44D, the relay associated with photocell 12D may control another variable speed motor to cause the above described assembly to revolve in a horizontal plane at the same time the rod is undergoing oscillations. The assembly can be caused to revolve concentrically or eccentrically and its speed of revolution controlled by switches 44I and 44J in a similar manner as explained above. The metal rod now gyrating can be also inclined to the horizontal plane, or can be made to spin along its long axis or both by similar control mechanisms.

Also, lights of varying intensity and colors can produce special optical effects as they play on the surface of the oscillating gyrating rod. These added effects may be recorded on the photographic film in programming by having additional operators working at the same time, or if desired, the film may be reversed, rolled back to a desired position, and reset for auxiliary programming by the one operator.

Thus it can be seen that the possible variations are wide and that these may be registered on film while actually being performed so as to conform exactly with the wishes of the operators.

After all the sequences of desired operations have been performed all the closed switches are opened including switch 42 and the film is wound onto the take-up reel and processed in accordance with the type of film as well-known in the art. The programming section is unplugged and disconnected from the remainder of the apparatus, and the proper insertions made in preparation for automation. Now, when the processed film is fed thru the automator channel 19 in the proper direction, the metal rod will undergo each and every action it was made to perform during the programing, including the synchronization of the music, the play of the lights, and when the end of the film has been reached, the action will cut-out and the film will automatically rewind. However, this particular film will automatically start in again as soon as it reaches the beginning of the film. Of course, the action could be made to stop or may be interrupted or the like and the film may be edited in any manner by cutting, splicing, adding to or deleting from the film.

It should now be further obvious from the above description that this invention can be equally applied to the programming and automating of any machine, device, process or system which can be at the present time operated by man provided that the operation of said machine, device, process, or system can be modified to be operated by electrical and/or mechanical means. The invention is applicable to any of the aforementioned machines, devices, processes, or systems which require the operation of a pedal, a lever, a switch, a knob, a wheel, a button, and the like or any combination thereof.

Other sensing and feedback information may be incorporated into the basic invention as ADD circuits in order to extend the field of utilization or to improve the preciseness or safety of the operation. As an example of such systems, the automation of a subway or train comes within the scope of this invention. By operating the train using the programmer-automator of this invention in the initial operation of the train, a record would be simultaneously made by the competent motorman of the starting up of the train, the acceleration, the distance traveled between stations, the deceleration as the destination is neared, and the stopping of the train. Photocells and interval timers coupled in the programmer-automator circuitry could care for the opening and closing of the doors and for the restarting up of the subway train. In addition, as safety devices, if the electrical power to the train motor or motor controls were in an ADD circuit with the closing of the doors and with the incidence of the interval timer, then if the doors were open, the train could not start or if the requisite time had not elapsed since the arrival at the station, the doors would not close. If the doors came open through an accident, the train would come to a stop. Also limiting speed swithces could be included in the outer circuitry to regulate the speed of the train if the load were reduced. Also other sensing devices could be added which would deal effectively with strange or unusual events not normally encountered in the operation of a subway.

The speed with which the film is propelled through the apparatus may be of wide rates. The faster the film moves, naturally, the more accurate and precise the automation will be. For some automation, where high precision is not necessary, the rate may be slow, a few inches per minute or a few inches per second, or if high accuracy is required, the rate of propulsion may be several hundred inches a second. Of course, the same rate of speed that is used in programming the full operation must be used in the automation. For this reason, the best results are obtained when the program is made directly with the equipment to be automated. If the tapes are to be used on other equipment of the same nature, it should first be checked to be certain that the self-same characteristics of the machines are identical. Copies of the programmed film are interchangeable, and the sprocket drive negates effects of temperature and moisture changes. Similarly, the parts of the programming and automation holders, drives, and so on must be interchangeable to insure preciseness.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. Means for programming and controlling the movement of apparatus operatively coupled to a plurality of driving means comprising the combination of a plurality of driving means, a separate light sensitive control device coupled to each of said driving means for controlling its operation, a separate light source positioned for illuminating each of said control devices for causing it to operate, means for independently controlling each of said light sources, means for moving a light sensitive recording medium, and guide means for positioning an unexposed light sensitive recording medium for exposure to said light sources for producing recordings corresponding to illumination of said light sensitive control devices and for thereafter positioning said medium with said recordings thereon intermediate said control devices and a beam of light, whereby the programmed movement of the apparatus may be exactly duplicated responsive to the recordings on said exposed medium.

2. The programming and control means as claimed in claim 1 in which said guide means comprises a pair of directing means for said recording medium one of which is positioned intermediate said light sensitive control devices and said light sources, and said means for moving said recording medium is positioned for moving said recording medium at both of said directing means.

3. The programming and control means as claimed in claim 1 in which said recording medium comprises an elongated photographic film and said guide means comprises a pair of spaced film guiding channels with said light sources positioned intermediate said spaced film guiding channels.

4. Means for programming and controlling the movement of apparatus operatively coupled to a plurality of driving means comprising the combination of a plurality of driving means, a separate light sensitive control device including a photocell coupled to each of said driving means for controlling its operation, a separate light source positioned for illuminating each of said photocells for causing its interconnected driving means to operate, means for independently controlling each of said light sources, means for advancing a photographic film, and guide means for positioning unexposed film for exposure to said light sources for producing recordings thereon corresponding to illumination of said photocells and for thereafter positioning said film with said recordings thereon intermediate said photocells and a beam of light, whereby the programmed movement of the apparatus may be exactly duplicated responsive to the recordings on said exposed film.

5. The programming and control means as claimed in claim 4 in which said guide means comprises a pair of directing means for said film one of which is positioned intermediate said photocells and said light sources, and said means for moving said film is positioned for moving said film at both of said directing means.

6. The programming and control means as claimed in claim 4 in which said guide means comprises a pair of spaced film guiding channels with said light sources positioned intermediate said spaced film guiding channels.

7. Means for programming and controlling the movement of apparatus operatively coupled to a plurality of driving means comprising the combination of a plurality of driving means, a separate light sensitive control device including a photocell coupled to each of said driving means for controlling its operation, a separate light source positioned for illuminating each of said photocells for causing it to operate its interconnected driving means, means for independently controlling each of said light sources, means for moving an elongated light sensitive recording medium, and guide means for positioning the unexposed light sensitive recording medium for exposure to said light sources for producing recordings corresponding to illumination of said photocells and for thereafter positioning said medium with said recordings thereon intermediate said photocells and a beam of light, whereby the programmed movement of the apparatus may be exactly duplicated responsive to the recordings on said exposed medium.

8. The programming and controlling means as claimed in claim 7 wherein said guide means comprises a pair of spaced and elongated guiding channels, said photocells being positioned adjacent to one of said channels, and said light sources being positioned intermediate said channels.

References Cited in the file of this patent
UNITED STATES PATENTS

| | | |
|---|---|---|
| 2,055,031 | Hutchings | Sept. 22, 1936 |
| 2,351,229 | Potts | June 13, 1944 |
| 2,395,422 | O'Dwyer | Feb. 26, 1946 |
| 2,574,104 | Ireland | Nov. 6, 1951 |
| 2,698,410 | Madsen et al. | Dec. 28, 1954 |
| 2,882,476 | Wetzel | Apr. 14, 1959 |
| 2,937,365 | Peaslee | May 17, 1960 |
| 3,039,101 | Perdue | June 12, 1962 |
| 3,040,322 | Mahaney et al. | June 19, 1962 |
| 3,048,846 | Martin | Aug. 7, 1962 |